United States Patent
Iwayasu

(10) Patent No.: US 8,518,580 B2
(45) Date of Patent: Aug. 27, 2013

(54) LITHIUM ION SECONDARY BATTERY AND OVERCHARGE INHIBITOR FOR SAME

(75) Inventor: Norio Iwayasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 817 days.

(21) Appl. No.: 12/712,624

(22) Filed: Feb. 25, 2010

(65) Prior Publication Data

US 2011/0020710 A1 Jan. 27, 2011

(30) Foreign Application Priority Data

Jul. 27, 2009 (JP) .................................. 2009-173824

(51) Int. Cl.
  *H01M 6/16* (2006.01)
  *H01M 6/24* (2006.01)
(52) U.S. Cl.
  USPC .......................................... 429/188; 429/341
(58) Field of Classification Search
  USPC .......... 429/188, 341, 324, 347, 303, 306–307
  See application file for complete search history.

(56) References Cited

U.S. PATENT DOCUMENTS

| | | | | |
|---|---|---|---|---|
| 5,879,834 A * | 3/1999 | Mao | .............................. | 429/332 |
| 6,645,674 B2 * | 11/2003 | Shin et al. | ................. | 429/231.95 |
| 2003/0228524 A1 * | 12/2003 | Heider et al. | .................. | 429/324 |
| 2006/0275666 A1 * | 12/2006 | Chang et al. | ................... | 429/223 |
| 2010/0178563 A1 * | 7/2010 | Ozaki et al. | ................. | 429/231.8 |
| 2010/0187506 A1 * | 7/2010 | Park et al. | ....................... | 257/40 |
| 2010/0213825 A1 * | 8/2010 | Park et al. | ....................... | 313/504 |

FOREIGN PATENT DOCUMENTS

| | | |
|---|---|---|
| JP | 9-106835 | 4/1997 |
| JP | 2003-022838 | 1/2003 |

OTHER PUBLICATIONS

L. M. Moshurchak et al.; Triphenylamines as a Class of Redox Shuttle Molecules for the Overcharge Protection of Lithium-Ion Cells, Journal of the Electrochemical Society, 155 (2), 2008, pp. A129-A131.

* cited by examiner

*Primary Examiner* — David C Mellon
(74) *Attorney, Agent, or Firm* — Antonelli, Terry, Stout & Kraus, LLP.

(57) ABSTRACT

There is provided a lithium ion secondary battery which suppresses overcharge while keeping battery characteristics. The lithium ion secondary, batter, has positive and negative electrodes facing each other via a separator and being filled with an electrolytic solution with a supporting electrolyte dissolved in a non-aqueous solvent, wherein the electrolytic solution contains overcharge inhibitor.

7 Claims, 1 Drawing Sheet

LITHIUM ION SECONDARY BATTERY AND OVERCHARGE INHIBITOR FOR SAME

FIELD OF THE INVENTION

The present invention relates to a lithium ion secondary battery.

BACKGROUND OF THE INVENTION

Lithium ion batteries have been studied to find various applicable products, because of their high energy density.

Various techniques have been developed to counter their overcharge. For example, JP-A-2003-22838 (Patent Document 1) discloses overcharge inhibitors of cyclohexylbenzene and biphenyl, and JP-A-9-106835 (Patent Document 2) discloses thiophene dissolved in an electrolytic solution. These techniques try to suppress the battery charging reactions on a positive electrode kept at a high potential in an overcharged battery by electrolytically polymerizing cyclohexylbenzene or the like to consume charging current.

Journal of the Electrochemical Society, 155(2), A129 (2008) (Non-patent Document 1) proposes an overcharge inhibitor of redox-shuttle type.

Patent Document 1: JP-A-2003-22838

Patent Document 2: JP-A-9-106835

Non-patent Document 1: Journal of the Electrochemical Society, 155(2), A129 (2008)

SUMMARY OF THE INVENTION

A lithium secondary batter, when overcharged, deteriorates in thermal stability, and may be short-circuited inside resulting from separation of metallic lithium in dendrite onto a negative electrode. The short-circuited battery suffers rapid release of battery energy, which may cause temperature runaway.

When cyclohexylbenzene or the like is totally polymerized electrolytically, on the other hand, the battery charging reactions will restart. It is therefore difficult to drastically suppress overcharging.

The overcharge inhibitor of redox-shuttle type is oxidized on a positive electrode kept at a high potential in an overcharged battery, transferred onto a negative electrode, where it is reduced to return back to the original state. It is oxidized and reduced in preference to the reactions of active materials in positive and negative electrodes. As such, it is expected to continuously suppress overcharge, because of the reversible nature of the reactions.

However, the overcharge inhibitor of redox-shuttle type, although improving safety, deteriorates battery characteristics. Therefore, it is an object of the present invention to provide an overcharge inhibitor which simultaneously satisfies the overcharge inhibiting characteristics and battery characteristics. It is another object to provide a lithium ion secondary battery in which the inhibitor is used.

The present invention uses a compound represented by Formula (1) as an overcharge inhibitor to solve the above problems. In Formula (1), A is oxygen, nitrogen, sulfur, selenium, silicon or phosphorus; $R_1$ and $R_2$ are each hydrogen or an organic group; and $X_1$ to $X_{12}$ are each hydrogen, a hydrocarbon group or halogen.

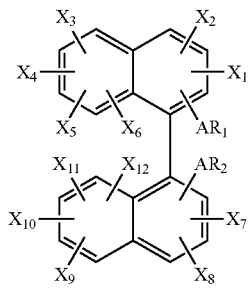
(Formula 1)

A compound represented by Formula (2) is more preferable for the overcharge inhibitor, wherein A is oxygen, and $AR_1$ and $AR_2$ are positioned as shown in Formula (2).

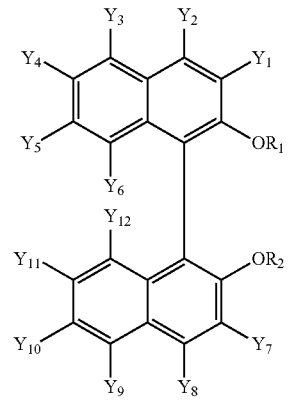
(Formula 2)

In formula (2), $Y_1$ to $Y_{12}$ are each a hydrocarbon group, hydrogen or halogen, and $R_1$ and $R_2$ are each hydrogen or an organic group.

The present invention also provides a lithium ion secondary battery with a positive electrode, negative electrode and electrolytic solution of non-aqueous solvent, wherein the electrolytic solution contains a compound represented by Formula (1) as an overcharge inhibitor, preferably at 0.1 to 8% by mass.

Other objects, features and advantages of the invention will become apparent from the following description of the embodiments of the invention taken in conjunction with the accompanying drawings.

Advantages Of The Invention

The present invention provides an overcharge inhibitor which simultaneously satisfies the overcharge inhibiting characteristics and battery characteristics, and also provides a lithium ion secondary battery high in safety and battery characteristics.

DETAILED DESCRIPTION OF THE INVENTION

Figure 2:
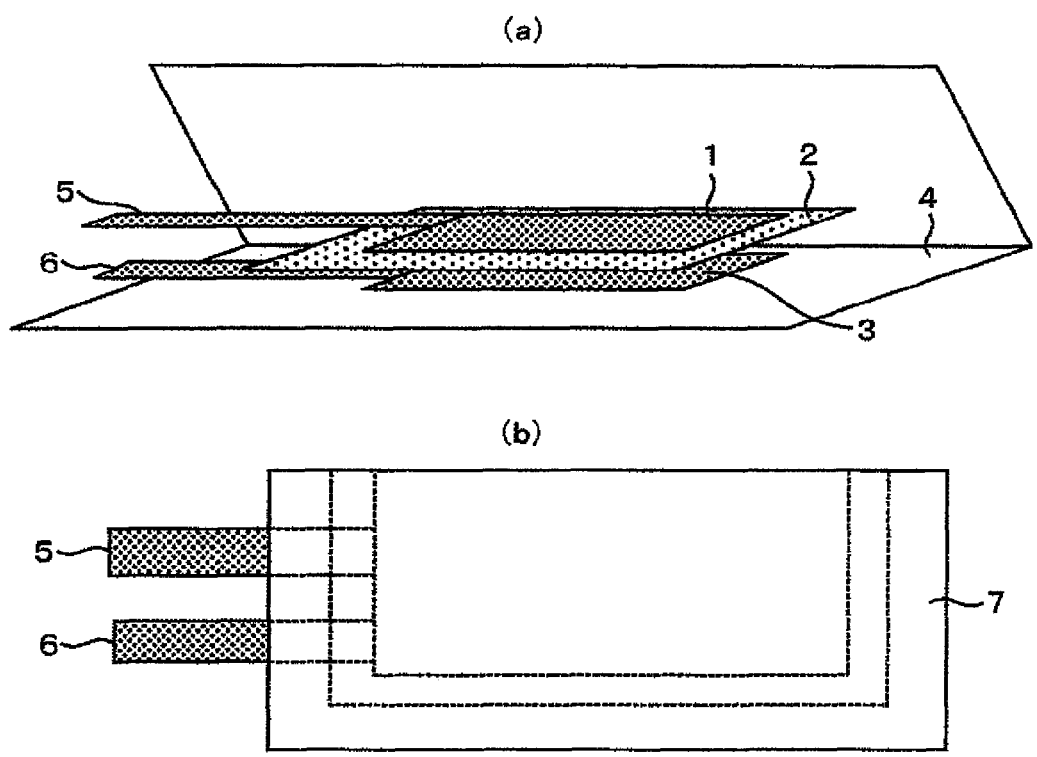
FIG. 2(a) shows a laminated structure of lithium ion secondary battery.
FIG. 2(b) shows a plan view of the battery.

FIG. 2 shows one example of the lithium ion secondary battery structure, with a positive electrode disposed to face a negative separator via a separator. All of these components are contained in a container of aluminum laminate, wherein the container is filled with an electrolytic solution.

Lithium ion secondary batteries have been widely used for notebook-size personal computers and cellular phones for their high energy density, and more recently have been studied to apply them as power sources for electric vehicles.

A lithium ion secondary battery may be equipped with a control circuit which stops charging on detecting an overvoltage condition to protect the battery. However, such a lithium ion secondary battery will have increased cost, and needs a countermeasure in the case of circuit failure. Use of an overcharge inhibitor is an effective approach to prevent overcharge problems.

The inventors have found, after having extensively studied to prevent overcharge, that a compound represented by Formula (1) exhibits excellent overcharge-inhibiting effects while adversely affecting the battery characteristics to a limited extent. A compound represented by Formula (2) exhibits particularly excellent characteristics. Therefore, use of a compound represented by Formula (1) as an overcharge inhibitor is expected to produce excellent overcharge-inhibiting effects without deteriorating battery characteristics.

$X_1$ to $X_{12}$ in Formulae (1) and $Y_1$ to $Y_{12}$ in Formula (2) are each hydrogen, a hydrocarbon group or halogen. It is possible to adjust oxidation potential of the overcharge inhibitor by adequately selecting $X_1$ to $X_{12}$ and $Y_1$ to $Y_{12}$. The overcharge inhibitor can be used in combination with a varying positive-electrode-active material, because its oxidation potential can be altered in accordance with the material.

A in Formula (1) is at least one element selected from the group consisting of oxygen, nitrogen, sulfur, selenium, silicon and phosphorus. A lone electron pair in oxygen, nitrogen, sulfur or the like makes the compound represented by Formula (1) or (2) serviceable as the overcharge inhibitor. Selection of A is essential for simultaneously satisfying the overcharge-inhibiting effect and battery characteristics. A is preferably oxygen, nitrogen, sulfur, silicon or phosphorus, of which oxygen, in particular, is the most preferable because it is electrochemically stable and capable of maintaining the battery characteristics.

$R_1$ and $R_2$ are each hydrogen or an organic group which is a functional group composed of carbon, hydrogen, oxygen, nitrogen, sulfur, phosphorus or halogen. The organic group works to prevent deterioration of Li battery characteristics. Hydrocarbon, oxyalkylene and acetyl groups are more preferable organic groups. Hydrocarbon groups include aliphatic groups, e.g., methyl, ethyl, propyl, isopropyl, butyl, isobutyl, dimethylethyl, pentyl, hexyl, heptyl, octyl, isooctyl, decyl, undecyl and dodecyl; and alicyclic groups, e.g., cyclohexyl and dimethylcyclohexyl. Of these, methyl, ethyl and propyl are more preferable. Oxyalkylene groups include oxymethylene, oxyethylene, oxypropylene, oxybutylene and oxytetramethylene groups. Oxyethylne or oxypropylene group is preferable for its capability of improving solubility in an electrolytic solution.

An electrolytic solution for the lithium ion secondary battery comprises a supporting electrolyte dissolved in a non-aqueous solvent. The non-aqueous solvent, which is not water, is not limited as long as it dissolves a supporting electrolyte. The non-aqueous solvents include organic solvents, e.g., diethyl carbonate, dimethyl carbonate, ethylene carbonate, ethylmethyl carbonate, propylene carbonate, γ-butyllactone, tetrahydrofuran and dimethoxyethane. They may be used either individually or in combination.

The supporting electrolyte is not limited as long as it is soluble in the non-aqueous solvent, and may be adequately selected from those commonly used for lithium ion secondary batteries. The examples include electrolytic salts, e.g., $LiPF_6$, $LiN(CF_3SO_2)_2$, $LiN(C_2F_6SO_2)_2$, $LiClO_4$, $LiBF_4$, $LiAsF_6$, LiI, LiBr, LiSCN, $Li_2B_{10}Cl_{10}$ and $LiCF_3CO_2$. They may be used either individually or in combination.

The positive-electrode-active material for the lithium ion secondary battery is not limited as long as it can occlude and release the lithium ion, and may be adequately selected from those commonly used for lithium ion secondary batteries. The examples include oxides of layered structure, e.g., $LiCoO_2$, $LiNiO_2$, $LiMn_{1/3}Ni_{1/3}CO_{1/3}O_2$ and $LiMn_{0.4}Ni_{0.4}CO_{0.2}O_2$; oxides of Mn of spinel crystalline structure, e.g. $LiMn_2O_4$ and $Li_{1+x}Mn_{2-x}O_4$, whose Mn may be partly substituted by another element, e.g., Co or Cr; and oxides of olivine structure, e.g., $LiFePO_4$, $LiCoPO_4$ and $LiMnPO_4$.

The negative-electrode-active material for the lithium ion secondary battery may be also adequately selected from those commonly used for lithium ion secondary batteries. These materials include natural graphite; easily graphitizable materials, e.g., coke derived from oil or pitch coke derived from coal, which is thermally treated at a high temperature of 2,500° C. or higher; mesophase carbon; amorphous carbon; fibrous carbon, metal alloyable with lithium; and granulous carbon impregnated with a metal, e.g., the one selected from the group consisting of lithium, silver, aluminum, tin, silicon, indium, gallium, magnesium and an alloy thereof. The metal or its oxide may be used as the negative-electrode-active material. Lithium titanate is also useful.

The separator for the lithium ion secondary battery may be made of any reinforcement material as long as it has no adverse effect on the battery. It may be adequately selected from materials which can separate the positive and negative electrodes from each other to prevent a short circuit. These include polymers, e.g., polyolefin, polyamide and polyester; and cloth of glass fibers, of which polyolefin, e.g., polyethylene or polypropylene, is particularly preferable. The films of polyolefin may be laminated on top of another. The separator has air permeability of 10 to 1,000 seconds/100 mL, preferably 50 to 800 seconds/100 mL, inclusive, and particularly preferably 90 to 700 seconds/100 mL, inclusive.

The overcharge inhibitor is reactive at a certain voltage, or battery operating voltage or more, to suppress overcharge. Specifically, the voltage is 2 V or more based on Li/Li+, preferably 3 V or more. The overcharge inhibitor will be reactive, when the level is excessively low, to deteriorate the battery characteristics. Dose rate of the overcharge inhibitor is also important for simultaneously satisfying the overcharge inhibiting characteristics and battery characteristics.

The overcharge inhibitor for the lithium ion secondary battery is included in the battery in such a way to suppress overcharge. It is particularly preferable to dissolve or suspended in an electrolytic solution.

When the overcharge inhibitor is used in the form of solution, it is dissolved in the electrolytic solution at 0.001 to 90% by mass, inclusive, preferably 0.05 to 20% by mass, inclusive, particularly preferably 0.1 to 8% by mass, inclusive wherein the percentage is defined by mass of the overcharge inhibitor divided by the total mass of the electrolytic solution and overcharge inhibitor. The overcharge inhibitor may deteriorate the battery characteristics at a concentration beyond the above range, and produce insufficient inhibiting effects at a concentration below the above range.

The embodiments of the present invention are described by Examples, which by no means limit the present invention.

EXAMPLE 1

Example 1 prepared the lithium ion secondary battery with Overcharge Inhibitor A (of 2,2'-dimethoxy-1,1'-binaphthalene, represented by Formula (2) with $R_1$ and $R_2$ of methyl and $Y_1$ to $Y_{12}$ of hydrogen, supplied from Aldrich), $LiFePO_4$ as the positive-electrode-active material, as-received plate-shape metallic lithium (supplied from Honjo Metal Corp.) as the negative electrode, $LiPF_6$ as the electrolyte salt dissolved in EC/DMC/EMC (1/1/1 by volume) as the solvent at 1 mol/L, and separator of polyolefin.

<Preparation of Positive Electrode>

An 85/10/10 by mass mixture of the positive electrode-active material ($LiFePO_4$), electroconductive agent (graphite SP270 supplied by Nippon Graphite Corp.) and binder (polyvinylidene fluoride KF1120, supplied by Kureha Chemical Industry Co., Ltd.) was prepared and incorporated in N-methyl-2-pyrrolidone to prepare the slurried solution. The slurry was spread on a 20 μm thick aluminum foil by a doctor blade and then dried. The resulting coating film contained the mixture at 100 $g/m^2$. The coated foil was cut to prepare the positive electrode.

<Preparation of Electrolytic Solution>

Figure 1:
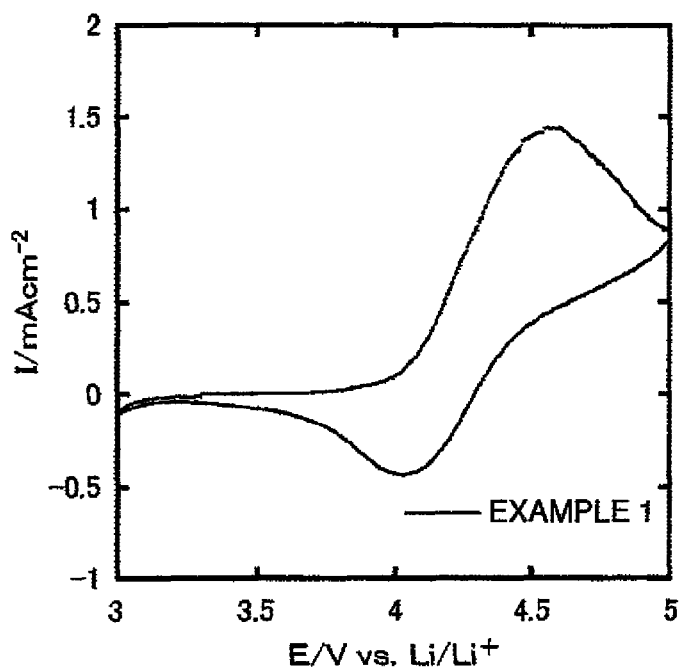
FIG. 1 shows one example of cyclic voltammetry analysis results of the electrolytic solution used in Example 1.

Overcharge Inhibitor A was incorporated in the electrolytic solution at 2% by mass, and the inhibitor-containing solution was analyzed by cyclic voltammetry (CV) with platinum as the working electrode and metallic lithium as the counter and reference electrodes, using a test cell which contained the inhibitor-containing electrolytic solution. The overcharge inhibitor concentration was set at 2% by mass. The CV analysis conditions were potential scanning speed: 10 mV and voltage range: 3.0 to 5.0 V. FIG. 1 shows one example of the cyclic voltammetry analysis results of the electrolytic solution used in Example 1. The electrolytic solution containing Overcharge Inhibitor A had an oxidation potential of 4.0 V, showing the reversible redox waves.

<Preparation of Battery>

A group of the positive and negative electrodes with the polyolefin separator in-between was prepared and contained in a case of laminated aluminum, and the case was closed after it was filled with the electrolytic solution to prepare the battery. The battery was subjected to 3 charge/discharge cycles for initialization.

<Evaluation of Battery>

1. Charge/Discharge Cyclic Test

The battery was charged with current to a given upper-limit voltage at a current density of 0.1 $mA/cm^2$, and current was discharged to a given lower-limit voltage at the same current density. The upper-limit and lower-limit voltages were set at 3.6 and 2.0 V with $LiFePO_4$ as the positive electrode-active material, and 4.3 and 3.0 V with $LiCoO_2$ as the positive electrode-active material.

The cyclic test was carried out by repeating the charge/discharge cycles under the above conditions at two temperature levels of room temperature and 50° C., and the cyclic battery characteristics was represented by the ratio of the discharge capacity after the first cycle was over to the discharge capacity after the $50^{th}$ cycle was over.

2. Overcharge Test

The battery was subjected to discharging to the lower-limit voltage and then preliminarily charged to the upper-limit voltage, and the charge capacity at this stage was defined as SOC 100%. The preliminarily charged battery was overcharged to SOC 200%. The overcharged battery voltage was measured to confirm the effects of the overcharge inhibitor. The battery showed a capacity maintenance factor of 85% at 25° C. and 75% at 50° C. The overcharge-tested battery was disassembled whether dendrite was deposited on the negative electrode. The overcharged battery kept a voltage of 3.5, showing no dendrite deposited on the negative electrode.

As discussed above, the lithium ion secondary battery with Overcharge Inhibitor A exhibited good characteristics while suppressing overcharge.

EXAMPLE 2

Example 2 prepared the lithium ion secondary battery in the same manner as in Example 1, except that content of Overcharge Inhibitor A was decreased from 2% by mass to 0.01% by mass. The battery showed a capacity maintenance factor of 86% at 25° C. and 76% at 50° C. The overcharged battery kept a voltage of 3.5 V, showing no dendrite deposited on the negative electrode, as found after the battery was disassembled. Overcharge Inhibitor A, when contained at the lower content, exhibited smaller overcharge-inhibiting effects, although causing no deterioration of the cell characteristics.

EXAMPLE 3

Example 3 prepared the lithium ion secondary battery in the same manner as in Example 1, except that content of Overcharge Inhibitor A was increased from 2% by mass to 10% by mass. The battery showed a capacity maintenance factor of 75% at 25° C. and 60% at 50° C. The overcharged battery kept a voltage of 3.5 V, showing no dendrite deposited on the negative electrode. Overcharge Inhibitor A, when contained at the higher content, exhibited deteriorated cell characteristics, although securing the overcharge-inhibiting effects.

EXAMPLE 4

Example 4 prepared the lithium ion secondary battery in the same manner as in Example 1, except that the negative electrode of metallic lithium was replaced by an electrode containing graphite as the electrode-active material (negative electrode of graphite).

The negative electrode of graphite was prepared by the following procedure. A 90/10 by mass mixture of graphite and binder (polyvinylidene fluoride KF1120, supplied by Kureha) was prepared and incorporated in N-methyl-2-pyrrolidone to prepare the slurried solution. The slurry was spread on a 20 μm thick aluminum foil by a doctor blade and then dried. The resulting coating film contained the mixture at 100 $g/m^2$. The coated foil was pressed to have a mixture bulk density of 1.0 $g/cm^3$, and cut to prepare the negative electrode.

The battery showed a capacity maintenance factor of 83% at 25° C. and 72% at 50° C. The overcharged battery kept a voltage of 3.4 V, showing no dendrite deposited on the negative electrode. Overcharge Inhibitor A kept the overcharge-inhibiting effects with the changed negative electrode.

EXAMPLE 5

Example 5 prepared the lithium ion secondary battery in the same manner as in Example 1, except Overcharge Inhibitor A was replaced by Overcharge Inhibitor B (of a compound represented by Formula (2) with $R_1$ and $R_2$ of $OCCH_3$ and $Y_1$ to $Y_{12}$ of hydrogen, supplied from Aldrich).

Overcharge Inhibitor B was incorporated in the electrolytic solution at 2% by mass, and the inhibitor-containing solution was subjected to the CV analysis. The inhibitor-containing electrolytic solution had an oxidation potential of 4.2 V, showing the reversible redox waves. The battery was prepared with the inhibitor-containing electrolytic solution, $LiFePO_4$ as the positive-electrode-active material and negative electrode of metallic lithium.

The battery showed a capacity maintenance factor of 87% at 25° C. and 78% at 50° C., indicating that the battery had improved factors over those with Overcharge Inhibitor A. The overcharged battery kept a voltage of 3.5 V, showing no dendrite deposited on the negative electrode.

EXAMPLE 6

Example 6 prepared the lithium ion secondary battery in the same manner as in Example 5, except that the negative electrode of metallic lithium was replaced by that of graphite. The battery showed a capacity maintenance factor of 83% at 25° C. and 72% at 50° C., indicating that the battery had improved factors over those with Overcharge Inhibitor A. The overcharged battery kept a voltage of 3.4 V, showing no dendrite deposited on the negative electrode.

EXAMPLE 7

Example 7 prepared the lithium ion secondary battery in the same manner as in Example 1, except that Over Charge Inhibitor A was replace by Overcharge Inhibitor C and $LiFePO_4$ as the positive-electrode-active material was replaced by $LiCoO_2$, wherein Over Charge Inhibitor C was of a compound represented by Formula (2) with $R_1$ and $R_2$ being each methyl, $Y_1$ to $Y_{12}$ except with $R_1$ and $R_2$ being each hydrogen and $Y_4$ and $T_{10}$ being each Br).

Over Charge Inhibitor C was prepared by the following procedure. One mol (444 g) of 6,6'-dibromo-1,1'-bi-2-naphthol (supplied from Tokyo Chemical) was dissolved in tetrahydrofuran to which 2.1 mols (50.4 g) of sodium hydride was added, and, after stirring for 30 minutes, 2.1 mols (298 g) of methyl iodide was added, and the mixture was stirred for 3 hours. The reaction effluent was separated by column chromatography to produce Over Charge Inhibitor C (of a compound represented by Formula (2) with $R_1$ and $R_2$ being each methyl, $Y_1$ to $Y_{12}$ except $Y_4$ and $Y_{10}$ being each hydrogen and $Y_4$ and $T_{10}$ being each Br) at a yield of 60%. Over Charge Inhibitor C was incorporated in the electrolytic solution at 2% b by mass and the resulting solution was subjected to the CV analysis. It had an oxidation potential of 4.5 V, showing the reversible redox waves.

The electrolytic solution containing Over Charge Inhibitor C at 2% by mass was used to prepare a battery with $LiCoO_2$ as the positive-electrode-active material and negative electrode of metallic lithium. It showed a capacity maintenance factor of 86% at 25° C. and 76% at 50° C. The overcharged battery kept a voltage of 4.5 V, showing no dendrite deposited on the negative electrode.

EXAMPLE 8

Example 8 prepared the lithium ion secondary battery in the same manner as in Example 7, except that the negative electrode of metallic lithium was replaced by that of graphite. It showed a capacity maintenance factor of 84% at 25° C. and 73% at 50° C. The overcharged battery kept a voltage of 4.4 V, showing no dendrite deposited on the negative electrode.

COMPARATIVE EXAMPLE 1

Comparative Example 1 prepared the lithium ion secondary battery in the same manner as in Example 1, except that no overcharge inhibitor was used. It showed a capacity maintenance factor of 86% at 25° C. and 78% at 50° C. The overcharged battery kept a voltage of 3.5 V, showing dendrite deposited on the negative electrode as found after the battery was disassembled.

COMPARATIVE EXAMPLE 2

Comparative Example 2 prepared the lithium ion secondary battery in the same manner as in Example 7, except that no overcharge inhibitor was used. It showed a capacity maintenance factor of 89% at 25° C. and 77% at 50° C. The overcharged battery kept a voltage of 4.7 V, showing dendrite deposited on the negative electrode as found after the battery was disassembled.

COMPARATIVE EXAMPLE 3

Comparative Example 3 prepared the lithium ion secondary battery in the same manner as in Example 4, except that no overcharge inhibitor was used. It showed a capacity maintenance factor of 86% at 25° C. and 75% at 50° C. The overcharged battery kept a voltage of 3.4 V, showing dendrite deposited on the negative electrode as found after the battery was disassembled.

COMPARATIVE EXAMPLE 4

Comparative Example 4 prepared the lithium ion secondary battery in the same manner as in Example 8, except that no overcharge inhibitor was used. It showed a capacity maintenance factor of 86% at 25° C. and 75% at 50° C. The overcharged battery kept a voltage of 4.6 V, showing dendrite deposition on the negative electrode as found after the battery was disassembled.

COMPARATIVE EXAMPLE 5

Comparative Example 5 prepared the lithium ion secondary battery in the same manner as in Example 1, except that triphenylamine (supplied by Aldrich) was used as the overcharge inhibitor. The electrolytic solution containing triphenylamine at 2% by mass had an oxidation potential of 3.8 V, as found by the CV analysis, showing the reversible redox waves.

The lithium ion secondary battery with the overcharge inhibitor of triphenylamine incorporated in the electrolytic solution at 2% by mass used the positive electrode with $LiFePO_4$ as the electrode-active material and negative electrode of metallic lithium. It showed a capacity maintenance factor of 70% at 25° C. and 50% at 50° C. The overcharged battery kept a voltage of 3.5 V, showing no dendrite deposited on the negative electrode.

COMPARATIVE EXAMPLE 6

Comparative Example 6 prepared the lithium ion secondary battery in the same manner as in Example 1, except that tris-4-bromophenylamine (supplied from Aldrich) was used as the overcharge inhibitor. The electrolytic solution containing tris-4-bromophenylamine at 2% by mass had an oxidation potential of 3.7 V, as found by the CV analysis, showing the reversible redox waves.

The lithium ion secondary battery with the overcharge inhibitor of tris-4-bromophenylamine incorporated in the electrolytic solution at 2% by mass used the positive electrode with LiFePO$_4$ as the electrode-active material and negative electrode of metallic lithium. It showed a capacity maintenance factor of 75% at 25° C. and 55% at 50° C. The overcharged battery kept a voltage of 3.5 V, showing no dendrite deposited on the negative electrode.

The results obtained in Examples 1 to 8 and Comparative Examples 1 to 6 are summarized in Table 1.

TABLE 1

| Example | Additive Structure R1 | R2 | Y$_1$ to Y$_{12}$, excluding Y$_4$ and Y$_{10}$ | Y$_4$ | Y$_{10}$ | Concentration (% by mass) | Battery Specifications Positive Electrode | Negative Electrode | Capacity Maintenance Factor at 50$^{th}$ cycle (25° C.) | (50° C.) | Overcharge Test Overcharge-tested Battery Voltage (V) | Deposition of Dendrite |
|---|---|---|---|---|---|---|---|---|---|---|---|---|
| 1 | Me | Me | H | H | H | 2 | LiFePO$_4$ | Metallic Lithium | 85 | 75 | 3.5 | Not observed |
| 2 | Me | Me | H | H | H | 0.01 | LiFePO$_4$ | Metallic Lithium | 86 | 78 | 3.5 | Observed |
| 3 | Me | Me | H | H | H | 10 | LiFePO$_4$ | Metallic Lithium | 75 | 60 | 3.5 | Not observed |
| 4 | Me | Me | H | H | H | 2 | LiFePO$_4$ | Graphite | 83 | 72 | 3.4 | Not observed |
| 5 | COCH$_3$ | COCH$_3$ | H | H | H | 2 | LiFePO$_4$ | Metallic Lithium | 87 | 78 | 3.5 | Not observed |
| 6 | COCH$_3$ | COCH$_3$ | H | H | H | 2 | LiFePO$_4$ | Graphite | 85 | 72 | 3.4 | Not observed |
| 7 | Me | Me | H | Br | Br | 2 | LiCoO$_2$ | Metallic Lithium | 86 | 76 | 4.5 | Not observed |
| 8 | Me | Me | H | Br | Br | 2 | LiCoO$_2$ | Graphite | 84 | 73 | 4.4 | Not observed |
| Comparative Example 1 | — | — | — | — | — | 0 | LiFePO$_4$ | Metallic Lithium | 86 | 78 | 3.5 | Observed |
| Comparative Example 2 | — | — | — | — | — | 0 | LiCoO$_2$ | Metallic Lithium | 89 | 77 | 4.7 | Observed |
| Comparative Example 3 | — | — | — | — | — | 0 | LiFePO$_4$ | Graphite | 86 | 75 | 3.4 | Observed |
| Comparative Example 4 | — | — | — | — | — | 0 | LiCoO$_2$ | Graphite | 86 | 75 | 4.6 | Observed |
| Comparative Example 5 | Triphenylamine | | | | | 2 | LiFePO$_4$ | Metallic Lithium | 70 | 50 | 3.5 | Not observed |
| Comparative Example 6 | Tris-4-bromophenylamine | | | | | 2 | LiFePO$_4$ | Metallic Lithium | 75 | 55 | 3.5 | Not observed |

It should be further understood by those skilled in the art that although the foregoing description has been made on embodiments of the invention, the invention is not limited thereto and various changes and modifications may be made without departing from the spirit of the invention and the scope of the appended claims.

(Description Of Reference Numerals)

1 Positive electrode
2 Separator
3 Negative electrode
4 Aluminum laminate
5 Lead for positive electrode
6 Lead for negative electrode
7 Weld

The invention claimed is:

1. A lithium ion secondary battery comprising a positive electrode, a negative electrode, a separator disposed between the positive electrode and the negative electrode, and an electrolytic solution with a supporting electrolyte dissolved in an non-aqueous solvent,
wherein the electrolytic solution contains a compound represented by Formula (1) (wherein A is oxygen; R$_1$ and R$_2$ are each hydrogen or an organic group; and X$_1$ to X$_{12}$ are each hydrogen, a hydrocarbon group or halogen)

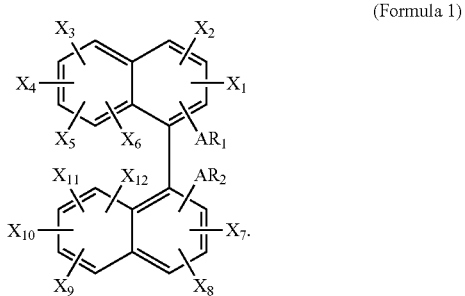

(Formula 1)

2. A lithium ion secondary battery comprising a positive electrode, a negative electrode, a separator disposed between the positive electrode and the negative electrode, and an electrolytic solution with a supporting electrolyte dissolved in an non-aqueous solvent, wherein the electrolytic solution contains a compound represented by Formula (2) (wherein $R_1$ and $R_2$ are each hydrogen or an organic group; and $Y_1$ to $Y_{12}$ are each hydrogen, a hydrocarbon group or halogen)

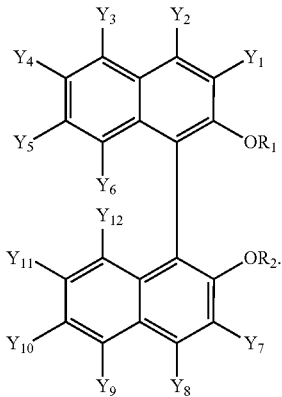

(Formula 2)

3. The lithium ion secondary battery according to claim 1, wherein the electrolytic solution contains the compound represented by Formula (1) at 0.1 to 8% by mass.

4. The lithium ion secondary battery according to claim 2, wherein $R_1$ and $R_2$ are each hydrogen, an aliphatic hydrocarbon group, an alicyclic hydrocarbon group, an oxymethylene group, or an acetyl group.

5. The lithium ion secondary battery according to claim 2, wherein the electrolytic solution contains the compound represented by Formula (2) at 0.1 to 8% by mass.

6. The lithium ion secondary battery according to claim 1, further comprising a container containing the positive electrode, the negative electrode, the separator, and the electrolytic solution.

7. The lithium ion secondary battery according to claim 2, further comprising a container containing the positive electrode, the negative electrode, the separator, and the electrolytic solution.

\* \* \* \* \*